Dec. 25, 1962 D. A. FLUEGEL ETAL 3,070,302
FLOW COMPUTER
Filed Aug. 15, 1958 2 Sheets-Sheet 1
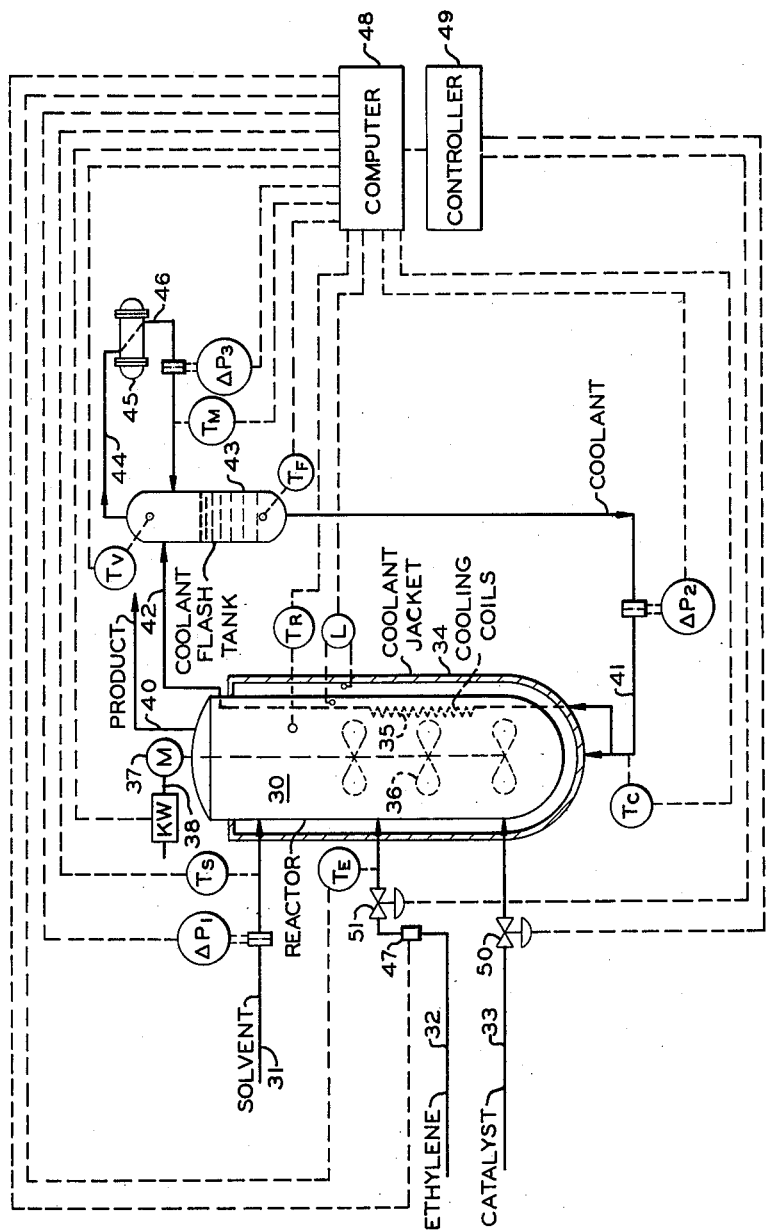
FIG. 1
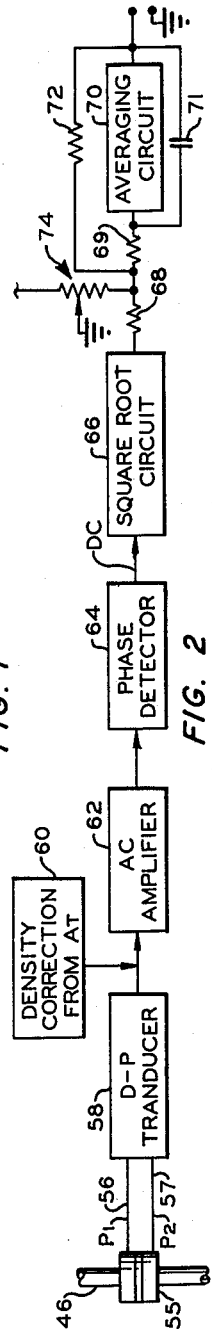
FIG. 2
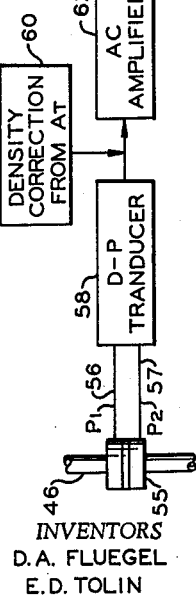
INVENTORS
D.A. FLUEGEL
E.D. TOLIN
BY
*Hudson & Young*
ATTORNEYS

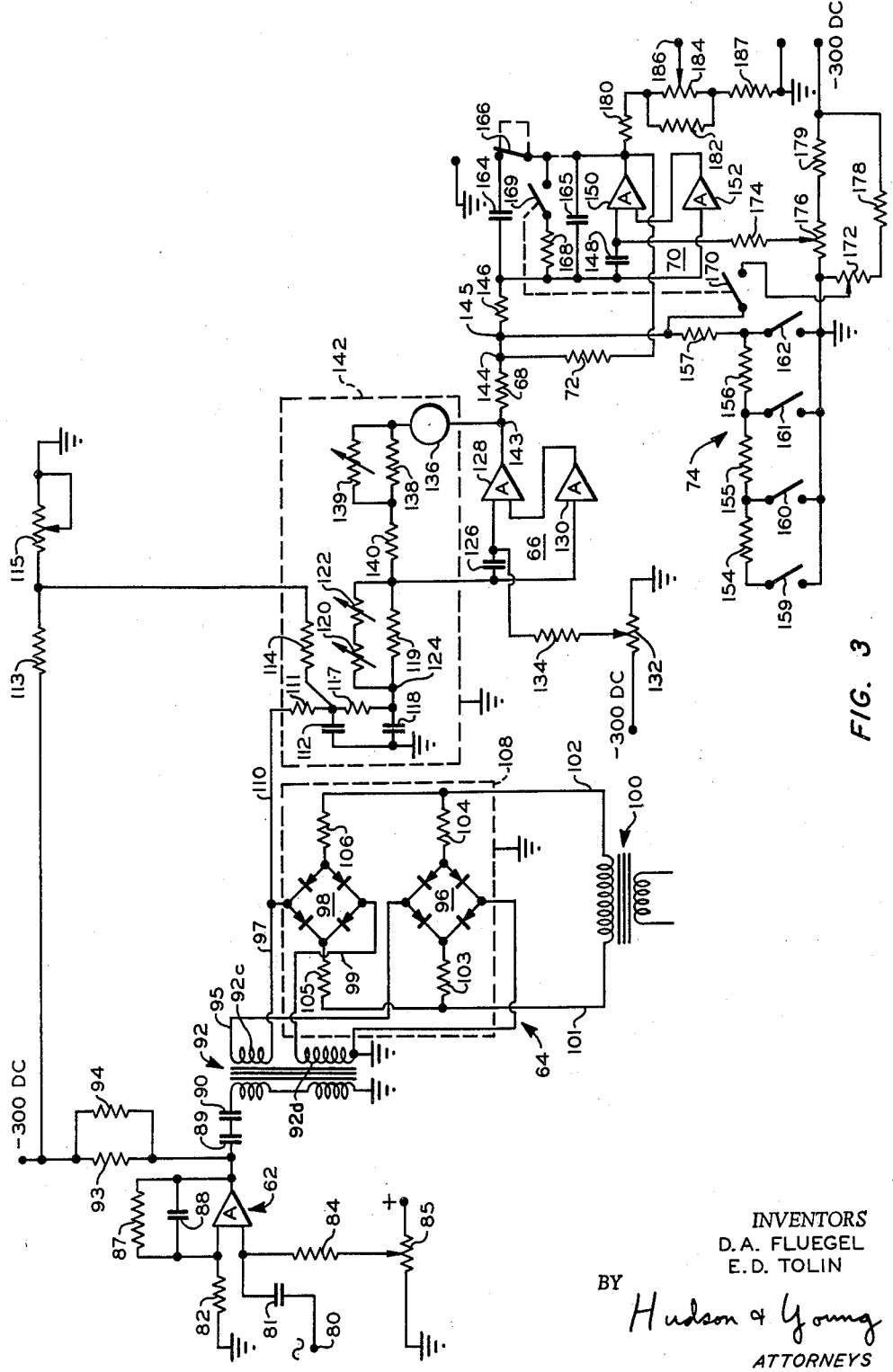

United States Patent Office 3,070,302
Patented Dec. 25, 1962

3,070,302
FLOW COMPUTER
Dale A. Fluegel and Ernest D. Tolin, Bartlesville, Okla., assignors to Phillips Petroleum Company, a corporation of Delaware
Filed Aug. 15, 1958, Ser. No. 755,307
7 Claims. (Cl. 235—151)

This invention relates to improved means for computing fluid flow. In one specific aspect, it relates to improvement in computing means for fluid flow where the flow is rapidly fluctuating and creates an undue amount of noise in the computing apparatus.

In some installations it is necessary to measure flow, compute the actual flow, and then to control a process from the signal thus computed. If the flow fluctuates rapidly, a considerable amount of noise is generated in the circuit and control is rough rather than smooth. This is especially true if the computed flow is used in a number of different places in the control system.

The instant invention enables the computation of flow with a minimum of effect from noise. The output signal from the instant invention is more usable for control because it is smoother and is less affected by noise. Such computing apparatus generally operates from a differential pressure ($\Delta p$) or differential head measurement ($\Delta h$) such as that taken across an orifice plate. Since flow is proportional to the square root of the differential pressure or head, as the case may be, the apparatus must be suitable for computing the square root. It is common in the prior art to average these differential pressures over a period and then to compute the square root from them. The drawback to this is that errors of considerable magnitudes are introduced in that signals that are a long way from the average value, by comparison, affect it more than they should. In the instant invention, this effect is eliminated as described below.

In the instant invention, the square root is taken first, then the values of the square roots are averaged. This is done responsive to a differential pressure or head measurement after the differential has been transmitted to a transducer which in turn provides an output electrical signal representative of the differential. The square root is taken of the differential and then averaged. This circuit includes a Thyrite feedback element which is temperature compensated with thermistors. The advantage of the instant system is that the average flow computed has less deviation than the instantaneous flow values. If the differential pressure should double, the square root would only change by roughly 40 percent. By having the square root taken first, and by having the advantage of less deviation of the average value from the instantaneous, the fluctuations in the signals are reduced in size, there is less noise in the circuit, and control is smoother.

Accordingly, it is an object of this invention to provide an improved apparatus for computing fluctuating flows. It is another object of this invention to provide a temperature compensated computer. It is still a further advantage to provide an improved apparatus that provides better control signals to a process. Other objects and advantages should become apparent from the following disclosure.

In the drawings:

FIGURE 1 shows schematically a polymerization reactor having a control system of which the instant invention is part;

FIGURE 2 is a block diagram of the instant invention;

FIGURE 3 shows schematically the circuit of the instant invention.

The present invention is broadly applicable to flow computations where noise is a problem. It has been applied in the control of polymerization reactions and has been found to solve certain problems existing there. The overall computer system into which the instant invention has been incorporated is set forth in greater detail in our copending application No. 700,612, filed December 4, 1957, entitled "Measurement and Control of Polymerization Reactions." The control system set forth in said application is a computer which computes the heat balance of the polymerization reaction, which is exothermic, and then provides a control signal which can adjust either the feed of an olefin or of a catalyst slurry. The heat balance is carried out by summing a plurality differential heats: the formula $q=Wc\Delta t$ is the basic formula used by the computer in its operation. W represents the weight rate of flow, c represents the specific heat, and $\Delta t$ represents the change in temperature. In operation the W is computed by the procedure disclosed in detail hereinafter from the measurement of a differential pressure or differential head, as $K\rho\sqrt{2g\Delta h}$, wherein $\rho$ is density, g is the gravitational acceleration, K is an orifice constant, and $\Delta h$ is differential head measurement. Since $\rho$ varies with temperature, it has been found to be a function of a square root value, as is set forth more fully below. Hence the computer, in fact, sums [c times $\Delta t$ times a square root of $\Delta h$ times the square root of some other value].

If the $\Delta h$ (or $\Delta p$) fluctuates rapidly, it is obvious that the summation taken for heat balance purposes will also fluctuate. This will cause the control to hunt. In the electrical computer such as shown in FIGURE 1, these fluctuations are termed "noise." This invention reduces the effect of noise from fluctuating flows. The operation for taking the square root is smoothed out and the entire system has an improved operation.

Referring now to FIGURE 1 of the drawing, there is shown a flow diagram which illustrates diagrammatically a preferred embodiment of the present invention. While the invention is described in conjunction with a particular polymerization process, it is to be understood that it is not intended to so limit the invention. The invention is applicable to any polymerization process in which the material to be polymerized and catalyst are continuously supplied to a polymerization reaction zone.

As shown in FIGURE 1, a suitable solvent, such as cyclohexane, enters a polymerization reactor 30 through an inlet conduit 31 at a temperature of 234° F. This solvent enters the system at a rate of 237,000 pounds per day and has a composition in weight percent as follows:

| | |
|---|---|
| Methane | Trace |
| Ethylene | 0.86 |
| Ethane | 0.07 |
| Cyclohexane | 99.07 |

A feed material, such as ethylene, enters reactor 30 through an inlet conduit 32 at a temperature of 260° F. This feed enters the system at a rate of 34,113 pounds per day and has a composition as follows:

| | |
|---|---|
| Methane | 0.38 |
| Ethane | 2.80 |
| Ethylene | 95.32 |
| Cyclohexane | 1.50 |

A catalyst enters reactor 30 through an inlet conduit 33. In the particular reaction referred to by way of example, the catalyst is added to the system in the form of a slurry in the solvent, 96% cyclohexane and 4% catalyst. This catalyst is a chromium oxide-silica-alumina catalyst prepared by impregnating a 90 weight percent silica and 10 weight percent aluminum gel composite with chromium trioxide which is dried and heated in air to form a composition containing approximately 2.5 weight percent chromium in the form of chromium oxide, of which approximately one-half is in the form of hexavalent chromium. The catalyst is added at the rate of 2,725 pounds of slurry per day.

Reactor 30 is surrounded by a jacket 34 through which a coolant is circulated. A coil of heat exchange tubes 35 is disposed within the interior of reactor 30. Cooling coil 35 and jacket 34, thus provide a means for removing heat from reactor 30 during the polymerization. Reactor 30 is provided with a stirrer 36 which is driven by a motor 37. Motor 37 is energized from a source of electrical energy, not shown, which is connected to the motor by means of a cable 38. The reactor effluent is withdrawn through a product conduit 40. This effluent, comprising a mixture of polymer, solvent, spent catalyst and unreacted ethylene, is subsequently passed to suitable separation means to recover the desired polymer.

The reaction mixture in reactor 30 is maintained at a desired temperature by circulating a coolant through jacket 34 and coils 35. It is desirable to employ the same material, cyclohexane, for the coolant as is employed for the solvent. This eliminates any additional separating problems if leakage should occur between the coolant conduits and the interior of the reactor. The coolant is introduced into the system through an inlet conduit 41 which communicates with jacket 34 and coils 35. The coolant is subsequently removed from the system through a conduit 42 which communicates with a flash tank 43. Vapor is removed from flask 43 through a conduit 44 which communicates with the inlet of a condenser 45. The condensed vapors are returned to tank 43 through conduit 46. The liquid in tank 43 is returned to reactor 30 through conduit 41. In order to simplify the drawing, the various pumps and valves and other controllers necessary to establish and control the flows of materials have been deleted.

From an inspection of FIGURE 1, it should be evident that heat is added to and removed from reactor 30 in several ways. In accordance with the present invention, the total heat liberated by the polymerization reaction is computed. This computation is made by subtracting the heat which enters the reactor from the heat which is withdrawn from the reactor. The amounts of these heats are obtained by summing a series of equations which represent the heat transferred into and out of reactor 30.

The first source of heat removal from reactor 30 results from the solvent supplied by conduit 31. This heat $Q_1$ can be calculated from the following equation:

$$Q_1 = K_1\sqrt{[\rho_1 + \alpha_1(T_0 - T_s)](\Delta P_1)}[C_1 + \beta_1(T_{Ave.} - T_1)](\Delta T_s) \quad (1)$$

where:
$K_1$=an orifice constant
$\rho_1$=density at To
$\alpha_1$=density temperature coefficient
$T_0$=a reference temperature
$T_s$=temperature of the solvent
$\Delta P_1$=pressure differential across an orifice in conduit 31
$C_1$=specific heat of the solvent at $T_1$
$\beta_1$=specific heat temperature coefficient
$T_{Ave.}$=average temperature, defined hereinafter
$T_1$=a reference temperature
$\Delta T_s$=temperature difference, defined hereinafter, see FIGURE 2

The heat $Q_2$ removed from the reactor by the coolant is represented as follows:

$$Q_2 = K_2\sqrt{\Delta P_2}(C_3)\Delta T_c \quad (2)$$

$K_2$=an orifice constant
$\Delta P_2$=pressure differential across an orifice in conduit 41
$\Delta T_c$=temperature difference, defined hereinafter, see FIGURE 2
$C_3$=specific heat of the coolant The sensible heat $Q_3$ removed by cooling of the condensed vapors from flash tank 43 is represented as follows:

$$Q_3 = K_3\sqrt{[\rho_1 + \alpha_2(T_0 - T_M)]\Delta P_3}(C_3)\Delta T_M \quad (3)$$

where:
$K_3$=an orifice constant
$T_M$=temperature of coolant in conduit 46
$\alpha_2$=density temperature coefficient
$\Delta P_3$=pressure differential across an orifice in conduit 46
$\Delta T_M$=temperature difference, defined hereinafter, see FIGURE 2.

Heat is also removed from reactor 30 due to conduction through the insulated walls of the reactor. This heat loss $Q_4$ can be represented as follows:

$$Q_4 = K_4 V \quad (4)$$

where:
$K_4$=a constant
$V$=temperature difference across reactor walls.

The major amount of heat removal results from the heat vaporization of the coolant. This is represented as follows:

$$Q_5 = K_3\sqrt{[\rho_1 + \alpha_2(T_0 - T_M)]\Delta P_3}[C_5 + \beta_2(T_v - M_1)] \quad (5)$$

where:
$K_3$=an orifice constant
$\Delta P_3$=pressure differential across an orifice in conduit 46
$C_5$=heat of vaporization of the coolant at $T_1$
$\beta_2$=heat of vaporization temperature coefficient
$T_v$=temperature of vapor in tank 43.

The heat $Q_6$ removed from the reactor by the olefin stream is represented as follows:

$$Q_6 = Flow\ (C_7)\ \Delta T_E \quad (6)$$

Where:
Flow=flow of the olefin
$C_7$=specific heat of the olefin
$\Delta T_E$=temperature difference, defined hereinafter, see FIGURE 2.

Heat is generated within the reactor by rotation of stirrer 36. This heat $Q_8$ is represented as follows:

$$Q_8 = (KW_{Load} - KW_{No\ Load}) \times 3.413 \quad (7)$$

where
$KW_{Load}$=energy supplied to motor 37 with a load on the stirrer
$KW_{No\ Load}$=energy supplied to motor 37 without a load on the stirrer
3.413=B.t.u. per kw. hour.

The heat $Q_7$ removed by the catalyst slurry is assumed to be constant. Heat is also supplied to reactor 30 due to the heat of solution of the olefin in the solvent. This is represented as follows:

$$Q_9 = Flow \times K_6 \quad (8)$$

where
$K_6$=constant relating to heat of solution.

The various quantities indicated in the foregoing equations are measured by the apparatus illustrated schematically in FIGURE 1. The temperatures of the materials flowing through conduits 31, 32, 41 and 46 are measured by temperature sensing elements $T_S$, $T_E$, $T_C$ and $T_M$, respectively. The temperature within reactor 30 is measured by temperature sensing element $T_R$. The temperatures of the liquid and vapor in tank 43 are measured by respective temperature sensing elements $T_F$ and $T_V$. The heat loss through the reactor walls is measured by a sensing element L. The heat generated by stirring 36 is measured in terms of the power supplied to motor 37. This power is measured by a wattmeter KW which can be a thermal converter of the type described in Bulletin 77-39-0-2 of Leeds & Northrup Company, Philadelphia, Pa., for example. The flow rates through conduits 31, 41 and 46 are measured in terms of pressure differences across orifices in the respective conduits. These pressure measurements are made by respective detecting elements $\Delta P_1$, $\Delta P_2$, and $\Delta P_3$. The outputs of the several detecting elements of FIGURE 1 are applied to a computer 48. The output signal of computer 48 energizes a controller 49 which regulates either a valve 50 in conduit 33 or a valve 51 in conduit 32. The rate of addition of catalyst or olefin to reactor 30 can thus be regulated to maintain the reaction at a uniform rate, as evidenced by a constant heat balance, so as to provide a product having uniform properties.

The various temperatures which are measured by the apparatus of FIGURE 1 can be conveniently obtained by means of thermocouples. Certain of these thermocouples are provided with cold junctions. Two separate thermocouples are employed to measure the temperature within reactor 30 (FIGURE 1), and $T_{R1}$ (not shown). The terminals of these various thermocouples are connected in a manner to provide the various quantities required. The three differential pressure measurements are either applied to their individual transducers or applied in sequence to a flow transducer (see 58, FIGURE 2) which provides an electric output representative of flow.

The heat loss through the reactor walls is measured by a series of spaced differential thermocouples such as L having first junctions near the inner walls and second junctions near the outer walls. The outputs of these differential thermocouples thus provide signals which are representative of the heat transferred through the reactor walls. The output signal of wattmeter KW is applied to the computer directly. The output signal of flowmeter 47, which provides a signal directly related to ethylene flow, is applied through a transducer to terminals of the computer. As will become apparent from the detailed description which follows, the several output signals from the apparatus are all direct current voltages. These voltages constitute the inputs to the computer.

In the described example, $T_E$, $T_S$, $T_V$, $T_F$, $T_M$, $T_R$ and $T_C$ are approximately 260° F., 234° F., 230° F., 228° F., 100° F., 280° F. and 229° F., respectively. $KW_{Load}$ is 35 kw. and $KW_{No\ Load}$ is 5 kw. Reactor 30 has a volume of 3300 gallons.

The noise is introduced into the control system of FIGURE 1 due to fluctuating flow of the condensate in conduit 46. This is due, in part, to belching and slugging in the cooling coil 35, in the jacket 34, in the condenser 45, and also to the operation of a liquid level controller (not shown) in condenser 45 that controls flow through the line 46. Since the liquid level control operates directly on flow in the line, and since the belching and slugging of gases causes fluctuation downstream of the control valve in the line, an undue amount of noise appears in the computer 48.

In FIGURE 2 is shown the computer circuit for computing the flow. The flow in conduit 46 is measured by an orifice plate 55. Conduits 56 and 57 transmit the differential pressure across the orifice to a transducer 58. This transducer converts the differential pressure (or differential head) into an alternating current (A.C.) signal. It may be of the type manufactured by the Swartwout Company, Cleveland, Ohio, as described in their Bulletin No. A-707 as their type D2T Differential Pressure Primary Element Transmitter. An apparatus 60 provides a signal to multiply this differential by the function that represents the density. This is denoted above as the square root of the density plus the density temperature coefficient times the difference of the fluid temperature from a reference temperature. Of course, in some systems this refinement may not be necessary and it may, therefore, be ommitted.

This A.C. signal is next amplified in amplifier 62 and then is converted to direct current (D.C.) in the phase detector 64. The D.C. is then transmitted to a square root circuit 66, the output of which is then applied through a resistor 68 and a resistor 69 to an averaging circuit. This averaging cricuit is a high gain stabilized D.C. amplifier. It has an adjustable feedback through a resistor 72, rheostat 74 and input resistor 69. It also has a capacitor 71 connected as a second feedback circuit around amplifier 70. The combination of adjustable feedback around amplifier 70 in conjunction with capacitor 71 causes the averaging circuit to have an RC time constant which is dependent on the amount of attenuation introduced by rheostat 74. For example, an attenuation of 60:1 will increase the time constant from 10 seconds to 10 minutes. Time constants of this order are difficult to obtain with conventional passive elements.

In FIGURE 3 there is shown the details of the circuit described in FIGURE 2 as elements 62 through 74. An input terminal 80 receives the signal from the transducer 58 and transmits it through a capacitor 81 to the amplifier 62. The other input of the amplifier is connected to ground through resistor 82. The bias is applied to the first input terminal through a resistor 84 which receives a positive polarity signal through potentiometer 85. A feedback loop comprising resistor 87 and capacitor 88 in parallel connects the output to the second terminal of amplifier 62. The output signal is also applied through capacitors 89 and 90, in series with each other, to the series connected coils in the primary of transformer 92. A negative bias is applied through the parallel connected resistors 93 and 94 to a junction between the amplifier output and capacitor 89.

After the signal has passed through the amplifier 62 and the transformer 92, it is applied to a phase detector 64. This phase detector is amplitude sensitive and has a linear change in output for changes in amplitude. Its purpose is to convert the A.C. signal to D.C. A lead 95 connects secondary coil 92c to a rectifier 96, while another lead 97 connects the other terminal of coil 92c to a terminal of a second rectifier 98. Another transformer secondary coil 92d is connected by lead 99 to another terminal of the rectifier 98. The other terminal of coil 92d is connected to ground, as is one terminal of the rectifier 96. Transformer 100 provides a source of A.C. which is applied to the rectifiers 96 and 98 through leads 101 and 102. The rectifiers are arranged in parallel between these leads and connected thereto by resistors 103, 104, 105, and 106 (for rectifiers 96 and 98, respectively). The rectifiers and resistors are disposed within a grounded shield 108. Preferably, the rectifiers are made up of silicon type diodes, because these are not temperature sensitive.

The output signal from the phase detector 64 is applied through a lead 110 to the square root circuit. The signal from 110 first passes through a resistor 111 to a junction with the grounded capacitor 112. A phase detector zero correction voltage is applied from the junction of resistor 113 and grounded rheostat 115 through resistor 114. The signal then goes from the junction of 111 and 112 through a resistor 117 to another junction with a capacitor 118 which is grounded. The RC filter comprising 111, 112 117 and 118 removes 120 cycle component from the phase detector output. The signal is then applied to junction 124 from whence it first passes through a temperature compensating circuit comprising a resistor 119 in parallel with the series circuit of a thermistor 120 and a thermistor 122. The junction 124 may be considered as the actual input terminal of the square root circuit.

The signal is transmitted from the junction 124 through a capacitor 126 to one terminal of a phase reversing amplifier 128. The signal also is transmitted through a stabilizing amplifier 130 to the other input terminal of amplifier 128. A biasing voltage is applied from potentiometer 132 through resistor 134 to the first-mentioned input terminal of the amplifier 128. A feedback circuit from the amplifier 128 output that comprises a Thyrite 136 connected in series with a temperature compensating circuit that comprises a resistor 138 in parallel with a thermistor 139, and another resistor 140.

The Thyrite 136 is a non-linear resistance. Current through the Thyrite varies as $E^N$, where N is made equal to 2 by combination of the Thyrite with a suitable series resistance in the amplifier feedback network. This connection results in an amplifier having an output voltage which is proportional to the square root of the applied input voltage. Further applications and other discussion of the Thyrite are set forth in U.S. Patent No. 2,643,348, issued to D. R. deBoisblanc, et al. on June 23, 1953. The circuit elements 111 through 124, and 136 through 140 are preferably enclosed in a grounded shield 142.

The output signal from the square root circuit 66 then appears at the junction 143 where it is then applied across resistor 68 to the junction 144 with the resistor 72 in a feedback circuit. Both 68 and 72 are matched with each other to have same resitsance. The summed signal appearing at 144 is then applied to junction 145 with feedback resistor 72, then through resistor 146 and series connected capacitor 148 to one terminal of an amplifier 150. A stabilizing amplifier 152 is connected between the resistor 146 and the other terminal of amplifier 150. The rheostat 74, while shown as an adjustable resistor or rheostat in FIGURE 2, has in the preferred embodiment, the structure shown in FIGURE 3. This circuit comprises the series connected resistors 154, 155, 156 and 157. Respective switches 159, 160, 161 and 162 connect the various series circuits formed to ground by being disposed between each two resistors and ground. Parallel connected feedback circuits through capacitors 164 and 165 are also provided. The capacitor 164 is of high capacitance and is normally maintained in parallel connection by normally closed switch 166. In one embodiment, capacitor 164 comprised a 10 microfarad condenser, 165 was .01 microfarad, and resistors 154 through 157 were 1, 0.2, 0.07, 0.06 megohms, respectively. The switch 166 is provided for adjustment purposes. It can be opened in order to provide a shortened time constant of the circuit comprising the averaging circuit 70. This facilitates initial adjustment of the circuit when setting biasing elements, etc., to "zero" it for operation.

Another feedback circuit around amplifier 150 comprises a resistor 168 in series with a normally open switch 169. The switch 169 is ganged to a normally open switch 170. These two switches are closed and the switch 166 is closed in order to reset averager output voltage to coincide with the input flow signal, so that operation of the averaging circuit will start at the proper operating level. Proper time constant is selected by switches 159 to 162. This eliminates an instantaneous reading of zero when the computer is started while there is flow in the line 46, which otherwise would introduce error for some time. The circuit through 170 is connected to a potentiometer 172 which receives a negative bias at one end and is used to adjust the aforesaid reset level. Bias is provided directly to the amplifier 150 through a resistor 174 which is connected to a potentiometer 176. In the arrangement shown, the respective potentiometers 172 and 176 are connected to a source of negative potential through respective resistors 178 and 179.

The output signal from the averaging circuit 70 is applied through a resistor 180 to the parallel connected circuit comprising resistors 182 and 184. Resistor 184 is connected to an adjusting means disposed between it and the output terminal 186. This latter arrangement is necessitated so that the output signal can be adjusted in magnitude to provide a calibrating means for the flow computer. This signal could also be applied to an electro-pneumatic converter for purposes of direct flow control. Another resistor 187 is connected in series between the parallel circuit and ground. This last connection also serves as the output ground terminal. The output from the circuit shown in FIGURE 3 is applied to the stepping switch in the computer 48 as shown in FIGURE 1.

Describing the operation, it is assumed that the apparatus is incorporated into the system as shown in FIGURE 1. This is by way of example but not by way of limitation. It is also assumed that various feed and effluent streams from the reactor are respectively being fed thereto and removed therefrom while the system is in operation.

Suppose now that a control signal indicative of flow, that is, a differential pressure is measured across the orifice 55 in the conduit 46. This differential pressure is then transmitted to the transducer 58 which converts the pressure signal to an equivalent or analogous alternating current electrical signal. This signal is then multiplied by the density correction shown earlier as $$\sqrt{\rho T_0 + \alpha(T_0 - T)}$$

(see Equations 1, 3 and 5 above). After this multiplication has taken place, we now have a signal that is representative of the number that is subsequently to have its square root taken and averaged. The next step is to convert the alternating current signal to direct current (D.C.). This is done in the phase detector 64. When the D.C. signal appears in the lead 110, it is then applied to the square root circuit. The feedback through the Thyrite 136 is a means for taking the square root of a value. The output signal from 66 then is a D.C. signal that represents the square root of the term set forth above in Equation number 3 above.

This signal is next applied to the circuit denoted as 70 in FIGURE 2 and shown in greater detail in FIGURE 3. When the signal first appears in this circuit, it is applied to the junction 144 and then is fed through the amplifier 150 where the feedback therefrom is applied through resistor 72 again to junction 144. The amplifier 150 is a phase reversing amplifier and, therefore, it will produce a signal that is fed back to 144 which will drive the input to zero.

Now since this is a continuous measurement of flow, let us assume that the circuit 70 has been adjusted so that it has a 10 minute time constant. This can be done by closing the switch 162. Now assume that a rapid increase in pressure differential is detected by the system. This signal is picked up by the transducer 58, converted to A.C., then amplified, converted to D.C. and the square root is taken in the circuit 66 before it is applied to the averaging unit 70. However, the RC time constant of the circuit 70 is of such magnitude that the previous signal is still stored on capacitors 164 and 165. The new signal level, which has resulted from an increased flow rate, causes amplifier 150 output to increase exponentially to a new value corresponding to the increased flow rate. The time constant is determined by the values of capacitor 164 and resistor 146 multiplied by the feedback attenuation ratio. It is adjusted in accordance with expected frequency and amplitude of flow variations and noise level desired in the output of the computer. This process is, of course, repeated as repeated fluctuations of signals are determined by the orifice 55 and transmitted thence into the computer comprising this invention.

Once the flow has been computed in the apparatus this signal is applied from the terminal 186 (FIGURE 3) to the stepping switch in the computer 48 of FIGURE 1. After this signal has been appropriately combined with other signals sent into the computer, the computer output signal is transmitted to the controller 49 and then is used to adjust either the valve 51 or the valve 50, as the case may be.

It should now be evident that the foregoing system is eminently suitable for computations of flow where the output signal is to be used for control. It is especially useful where there are fluctuations in flow, because disposition of the square root circuit ahead of the averaging circuit dampens or reduces the effect of changes sensed by the measuring element. This means that the averaging circuit receives a series of signals which are more closely grouped in magnitude to each other than it would if another arrangement was used. By appropriate selection of the time constant, through making the adjustments which have been described above, the averaging circuit can produce a signal representative of the average flow. This is achieved with the use of components having reasonable impedance levels, and with a circuit that has selectively adjustable time constants. Other novel points which should be noted are the novel circuit involving the summing feedback circuit through resistor 72 in combination with an integrating circuit that incorporates the amplifier 150 having feedbacks through capacitors 164 and 165. Another novel feature is the use of thermistors in the square root circuit to prevent errors arising from temperature variations. Thermistors are circuit elements that change resistance in a negative manner when subjected to temperature changes.

As should be evident from the foregoing, when we refer to a "square root circuit" in the following claims we define a circuit that produces an output signal in response to and representative of the square root of an input signal. Similarly, the "averaging" or integrating circuit provides an output signal that represents the average value of signals applied to such a circuit.

While we have disclosed specific application for our novel flow computer in the above specification and drawings, it is not our intention to be limited thereto, but to include as our invention all those modifications thereof which would be obvious to one skilled in the art.

We claim:

1. Apparatus for producing from a varying input signal an averaged output signal that is suitable for use in a computer, comprising means for establishing an alternating current input signal representative of a measured variable; a phase detector connected to said means, having a linear response to the amplitude of input signal and producing a direct current signal representative thereof; a first circuit connected to said phase detector for producing a signal representative of the square root of the direct current signal; and a second circuit connected to said first circuit for averaging the square root signals produced by said first circuit.

2. An improved flow computing apparatus comprising a conduit; an orifice disposed in said conduit; means connected to said conduit adjacent said orifice for establishing a differential pressure; a transducer connected to said means, that establishes an alternating current representative of the differential pressure; an amplifier connected to said transducer; a phase detector connected to said amplifier for converting the representative alternating current into a direct current representative thereof; a square root circuit connected to said phase detector; and an averaging circuit connected to said square root circuit.

3. In the combination that comprises apparatus for establishing a differential pressure that is representative of a fluid flow; a transducer to convert the differential pressure to an electrical signal representative thereof, and apparatus to compute the flow from the representative electrical signal, the improvement in the apparatus to compute comprising a first electrical circuit, the output of which varies as the square root of the voltage applied thereto; a second electrical cricuit, the output of which is an average of the voltage signals applied thereto; first means for applying the electrical signal representative of the pressure differential to the input of said first electrical circuit; second means for applying the electrical output signal of said first electrical circuit directly to the input of said second electrical circuit; said first electrical circuit comprising an amplifier having a first input terminal and an output terminal, a feedback circuit the current flow through which varies as the square of the voltage applied thereto connected between said amplifier output terminal and said input of said first electrical circuit, said feedback circuit comprising a non-linear resistor and a thermistor connected in series with said resistor; and a capacitor disposed in said first means for applying between said input of said first electrical circuit and said amplifier first input terminal.

4. In the combination that comprises apparatus for establishing a differential pressure that is representative of a fluid flow, a transducer to convert the differential pressure to an electrical signal representative thereof, and apparatus to compute the flow from the representative electrical signal, the improvement in the apparatus to compute comprising a first electrical circuit, the output of which varies as the square root of the voltage applied thereto; a second electrical circuit, the output of which is an average of the voltage signals applied thereto; first means for applying the electrical signal representative of the pressure differential to the input of said first electrical circuit; second means for applying the electrical output signal of said first electrical circuit directly to the input of said second electrical circuit; said first electrical circuit comprising an amplifier and a feedback circuit connected to said amplifier; said feedback circuit including a resistor, the current flow through said feedback circuit varying as the square of the voltage applied thereto, and a means connected in series with said resistor for compensating the resistance of said feedback circuit for variations in temperature.

5. In the combiantion that comprises apparatus for establishing a differential pressure that is representative of a fluid flow, a transducer to convert the differential pressure to an electrical signal representative thereof, and apparatus to compute the flow from the representative electrical signal, the improvement in the apparatus to compute comprising a first electrical circuit, the output of which varies as the square root of the voltage applied thereto; a second electrical circuit, the output of which is an average of the voltage signals applied thereto; first means for applying the electrical signal representative of the pressure differential to the input of said first electrical circuit; second means for applying the electrical output signal of said first electrical circuit directly to the input of said second electrical circuit; said second electrical circuit comprising an amplifier having an input terminal and an output terminal, first and second capacitors connected in parallel in a first feedback circuit between said output and input terminals of said amplifier, a first resistor disposed in a second feedback circuit around said amplifier, a second resistor of substantially equal resistance to said second resistor and disposed in said second means for applying, a junction comprising one terminal of each of said first and second resistors, first means for connecting said junction to said amplifier input terminal, and second means for connecting said first means for connecting to a source of potential.

6. The apparatus of claim 5 wherein said second means for connecting comprises an adjustable resistor.

7. In the combination that comprises apparatus for establishing a differential pressure that is representative of a fluid flow, a transducer to convert the differential pressure to an electrical signal representative thereof, and apparatus to compute the flow from the representative electrical signal, the improvement in the apparatus to compute comprising a first electrical circuit, the output of which varies as the square root of the voltage applied thereto; a second electrical circuit, the output of which is an average of the voltage signals applied thereto; first means for applying the electrical signal representative of the pressure differential to the input of said first electrical circuit; second means for applying the electrical output signal of said first electrical circuit directly to the input of said second electrical circuit; said second electrical circuit comprising an amplifier having first and second feedback circuits, a capacitor disposed in said feedback circuit, a resistor disposed in said second feedback circuit, said first and second feedback circuits being connected to the same input terminal of said amplifier, and means for applying a preselected potential to said same input terminal.

References Cited in the file of this patent

UNITED STATES PATENTS

| | | |
|---|---|---|
| 2,522,574 | Hagenbuch | Sept. 19, 1950 |
| 2,774,825 | Sherr | Dec. 18, 1956 |
| 2,959,958 | Savet | Nov. 15, 1960 |

OTHER REFERENCES

Transactions of AIEE (Hornfeck) July 1952 (pages 183–193), vol. 71, part I.

Electronic Engineering (Baxter) March, 1954 (pages 97–99).

IRE Transactions of Electronic Computers (Kovach et al.), June 1954, pp. 42–45.

Electronic Analog Computers, 2nd ed. (Korn & Korn) 1956, page 416.

Automatic Control (Johnson et al.), December 1956 (pages 18–23).

IRE Transactions of Electronic Computers (Kovach et al.), June 1958, pp. 91–96.